(12) United States Patent
Dantlgraber

(10) Patent No.: US 6,884,057 B2
(45) Date of Patent: Apr. 26, 2005

(54) ELECTROMECHANICAL CLAMPING DEVICE

(75) Inventor: Jörg Dantlgraber, Lohr am Main (DE)

(73) Assignee: Bosch Rexroth AG, Lohr (DE)

( * ) Notice: Subject to any disclaimer, the term of this patent is extended or adjusted under 35 U.S.C. 154(b) by 50 days.

(21) Appl. No.: 10/469,634

(22) PCT Filed: Mar. 13, 2002

(86) PCT No.: PCT/EP02/02727

§ 371 (c)(1),
(2), (4) Date: Aug. 30, 2003

(87) PCT Pub. No.: WO02/076703

PCT Pub. Date: Oct. 3, 2002

(65) Prior Publication Data

US 2004/0081722 A1 Apr. 29, 2004

(30) Foreign Application Priority Data

| Mar. 21, 2001 | (DE) | ......................................... 101 13 808 |
| Apr. 17, 2001 | (DE) | ......................................... 101 18 823 |
| Sep. 22, 2001 | (DE) | ......................................... 101 46 800 |

(51) Int. Cl.[7] .............................................. B29C 45/68
(52) U.S. Cl. ..................... 425/150; 425/589; 425/590
(58) Field of Search ................................ 425/149, 150, 425/589, 590, 450.1, 451.2

(56) References Cited

U.S. PATENT DOCUMENTS

| 3,611,502 | A | * | 10/1971 | Florjancic | ................... 425/590 |
| 3,704,973 | A | * | 12/1972 | Renfrew et al. | ............ 425/150 |
| 5,129,806 | A | * | 7/1992 | Hehl | ........................ 425/450.1 |
| 6,439,875 | B1 | * | 8/2002 | Morita et al. | ................ 425/590 |

FOREIGN PATENT DOCUMENTS

| DE | 4344340 | 6/1995 |
| WO | 92/11993 | 7/1992 |
| WO | 01/89801 | 11/2001 |

OTHER PUBLICATIONS

Publication "Grundlagen und Komponenten der Fluidtechnik—Der Hydraulik Trainer. Band 1" (Principles and Components of Fluid Technology—the Hydraulic Trainer, vol. 1) from Mannesmann Rexroth GmbH, RD 00290/10.91 (second edition), 1991, pp. 124–125.

* cited by examiner

Primary Examiner—James P. Mackey
(74) Attorney, Agent, or Firm—Martin A. Farber

(57) ABSTRACT

An electromechanical clamping device with hydraulic assistance. A thrust mechanism driven by an electric motor displaces two clamping jaws with respect to each other along a guide device. One clamping jaw is divided into two mutually displaceable part java. A chamber to hold pressure medium is formed between the part jaws. The first part jaw can be displaced along the guide device and locked with respect to the latter. One part jaw is provided with a first cylinder coupled to the output of the thrust mechanism. In order to close the clamping device, in a first step the thrust mechanism pulls the part jaws against the other clamping jaw, and in a second step the thrust mechanism delivers pressure medium from the first cylinder into the chamber between the two part jaws, with the first part jaw locked with respect to the guide device. To open the clamping device, in a first step a second cylinder arranged between the two part jaws pulls the part jaws against each other, with the first part jaw locked with respect to the guide device, and then in a second step the thrust mechanism forces the part jaw coupled to it in the opening direction, forcing the other part jaw with it, with the first part jaw unlocked from the guide device. The clamping device is provided for production machines, in particular for injection molding machines.

15 Claims, 3 Drawing Sheets

ELECTROMECHANICAL CLAMPING DEVICE

The invention pertains to an electromechanical clamping device with hydraulic assistance for a production machine, in particular for an injection molding machine.

FIELD AND BACKGROUND OF THE INVENTION

In this case, the invention is based on an electromagnetic clamping device with hydraulic assistance. Clamping devices of this type are used for production machines, for example injection molding machines. The clamping device has two clamping jaws on which in each case a part mold of a divided mold is held. A thrust mechanism driven by an electric motor displaces the clamping jaws with respect to each other along a guide device. The first clamping jaw is divided into two part jaws, which can be displaced with respect to each other in the direction of the guide device. The part jaws interengage in such a way that a chamber to hold pressure medium is formed between them. The first part jaw can be displaced along the guide device. The output of the thrust mechanism acts on one of the part jaws. In order to close the clamping device, in a first step the thrust mechanism pulls one part jaw against the second part jaw, pulling the other part jaw with it, and in a second step the thrust mechanism delivers pressure medium into the chamber between the two part jaws, with the first part jaw locked against the guide device. During the closing of the clamping device, the thrust mechanism is loaded in tension. By contrast, during the opening of the clamping device, the thrust mechanism is loaded in compression. In this case, in order to pull the part molds apart, a substantially higher force is required than for the following action of moving apart the clamping jaws bearing the part molds. The thrust mechanism therefore has to be dimensioned in accordance with the high force required to pull the mold apart.

SUMMARY OF THE INVENTION

The invention is based on the object of providing a clamping device with hydraulic assistance in which the thrust mechanism needs to be dimensioned only in accordance with the force required to pull the clamping jaws apart, without there being any overloading of the thrust mechanism when pulling the mold apart.

This object is achieved by a device according to the invention, wherein by means of the hydraulic assistance during the pulling-apart procedure, the compressive force exerted by the electric motor on the thrust rod can be limited in such a way that no impermissibly high bending of the thrust rod takes place during the pulling-apart procedure.

Advantageous developments of the invention are respectively the subject matter of further features set forth herein.

BRIEF DESCRIPTION OF THE DRAWINGS

The invention will be explained in more detail below, with its further details, using exemplary embodiments illustrated in the drawings, in which.

DETAILED DESCRIPTION OF THE PREFERRED EMBODIMENT

Figure 1:
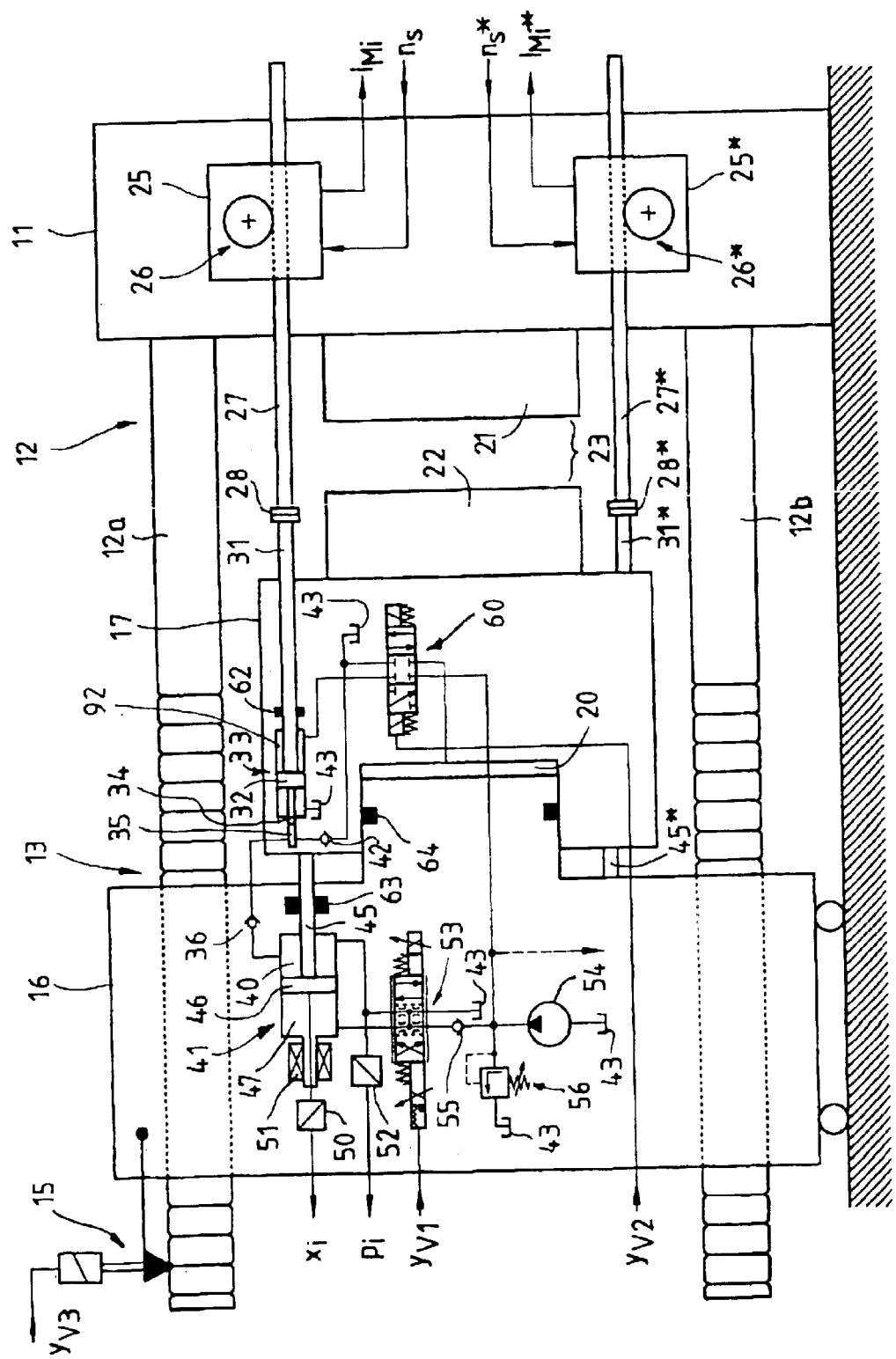
FIG. 1 shows the structure of a first clamping device according to the invention in a simplified illustration.

FIG. 1 shows the structure of a clamping device according to the invention in a simplified illustration. The clamping device has a fixed clamping jaw 11 and a clamping jaw 13 which can be displaced along a guide device 12. The guide device 12 is formed by two crossbeams 12a and 12b, which are provided with a latching division. In order to lock the displaceable clamping jaw 13 to the guide device 12, a latching device 15, which is illustrated only schematically and is controlled by a signal $y_{v3}$, latches into a detent in the crossbeam 12a. In a corresponding way, a further controlled latching device which, for reasons of clarity, is not illustrated in FIG. 1, latches into a detent in the crossbeam 12b. The clamping jaw 13 is formed from two interengaging part jaws 16 and 17, which can be displaced with respect to each other in the direction of the guide device 12. The latching device 15 is held on the part jaw 16. The part jaws 16 and 17 enclose between them a chamber 20 to hold hydraulic pressure medium. Between the clamping jaws 11 and 13, a mold 23 comprising two part molds 21 and 22 is held. The first part mold 21 is held on the clamping jaw 11. The other part mold 22 is held on the part jaw 17. An electric motor 25, which is held on the fixed clamping jaw 11, drives a thrust mechanism 26. The electric motor 25 is supplied, by a machine control system illustrated in FIG. 3, with a desired rotational speed value $n_s$ as input variable. The current $i_{Mi}$ drawn by the electric motor 25 is a measure of the force acting on the thrust rod 27. The current $i_{Mi}$ is supplied to the control device, illustrated in FIG. 3, as input signal. The thrust mechanism 26 translates the rotational movement of the electric motor 25 into a longitudinal movement of the thrust rod 27, which forms the output of the thrust mechanism 26. A coupling 28 connects the thrust rod 27 via a piston rod 31 to the piston 32 of a double-ended cylinder 33. In accordance with the publication "Grundlagen und Komponenten der Fluidtechnik—Der Hydraulik Trainer, Band 1" [Principles and Components of Fluid Technology— the Hydraulic Trainer, Vol. 1] from Mannesmann Rexroth GmbH, RD 00290/10.91 (second edition, 1991), pp. 124 to 125, double-ended cylinder here designates a double-acting cylinder with piston rods on both sides, in which the diameters of the two piston rods can also be of different sizes. The double-ended cylinder 33 is held on the displaceable part jaw 17. On the side facing away from the thrust rod 27, the piston 32 is connected to a second piston rod 34. The piston rod 34 penetrates into a further chamber 35. The chamber 35 is connected via a first nonreturn valve 36 to the chamber 40 on the rod side of a differential cylinder 41. In addition, the chamber 35 is connected to a tank 43 via a replenishing valve 42. The differential cylinder 41 is held on the part jaw 16. It is connected via a piston rod 45 to the part jaw 17. The piston of the differential cylinder 41 is provided with the designation 46, and the chamber on the crown side with the designation 47. A displacement transducer 50 converts the output signal from a displacement sensor 51, which is connected to the piston 46, into an electric signal $x_i$, which is a measure of the position of the piston 46 and therefore also a measure of the distance between the part jaws 16 and 17. A pressure transducer 52 converts the pressure in the chamber 40 into an electric signal $p_i$ corresponding to said pressure. A hydraulic control device in the form of a proportional valve 53 controls the flow of pressure medium from a pump 54 to the differential cylinder 41 and from the latter to the tank 43 as a function of an actuating signal $y_{v1}$. A nonreturn valve 55 is arranged between the pump 43 and the proportional valve 41. A pressure limiting valve 56 limits the output pressure of the pump 54 in the usual way. Arranged between the pump 54 and the double-ended cylinder 33 is a hydraulic control device in the form of a control valve 60 with three control positions. The control valve 60 controls the flow of pressure medium from the pump 54 to the double-ended cylinder 33 and from the latter to the tank 43 as a function of an actuating signal $y_{v2}$. Seals are designated 62, 63 and 64.

In order to act uniformly with force on the part jaw 17, in addition to the electric motor 25, a further electric motor 25* is provided, which is connected via a thrust mechanism 26*, a thrust rod 27* and a coupling 28* to the piston rod 31* of a further double-ended cylinder corresponding to the double-ended cylinder 33. The piston rod of a further differential cylinder corresponding to the differential cylinder 41 is designated 45*. The construction and pressure medium supply of the further double-ended cylinder and of the further differential cylinder correspond to the cylinders already described above.

Figure 3:
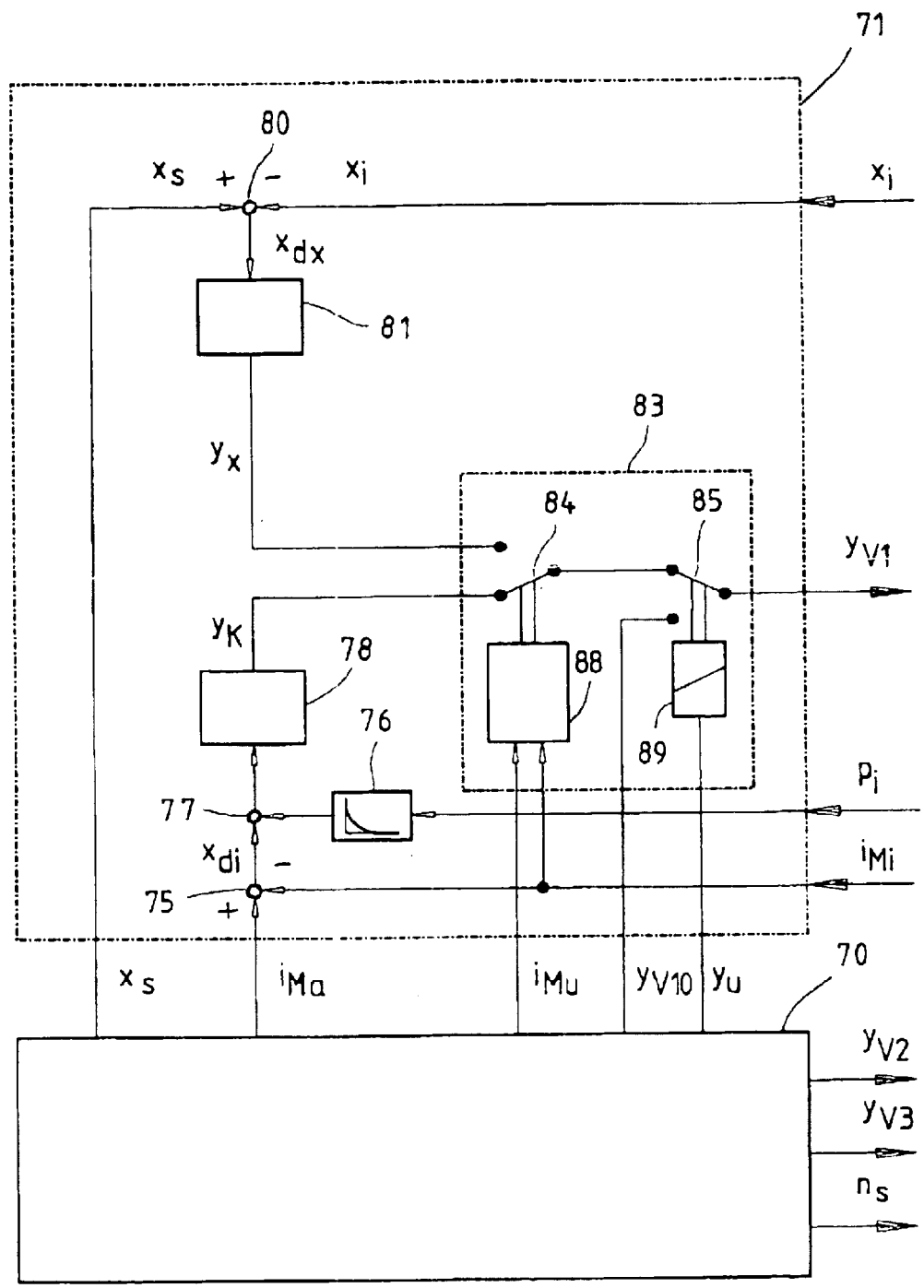
FIG. 3 shows the block diagram of a control system for the clamping devices illustrated in FIGS. 1 and 2.

FIG. 3 shows the block diagram of a control system for the upper half of the clamping device illustrated in FIG. 1. The control of the components provided with an * of the lower half of the clamping device illustrated in FIG. 1 is carried out in a corresponding way. The parameters and desired values required for the control of the operating sequence of the production machine are stored in a higher-order machine control system 70. The machine control system 70 supplies the electric motor 25 with the desired rotational speed value $n_s$. The machine control system 70 determines the position of the control piston of the control valve 60 via the actuating signal $y_{v2}$ and controls the latching device 15 via the actuating signal $y_{v3}$. The machine control system 70 supplies an electric control device 71 with a desired position value $x_s$ for the position of the piston 46, a desired current value $i_{Ma}$ for the electric motor 25, a threshold value $i_{Mu}$ for changing over from position control to force control, an actuating signal $y_{v10}$ and a changeover signal $y_u$. The desired current value $i_{Ma}$ determines the maximum value of the force with which the electric motor 25 forces the thrust rod 27 against the part jaw 17. As already described above, the control device 71 of the clamping device illustrated in FIG. 1 is supplied with the actual current value $i_{Mi}$ of the electric motor 25, the actual position value $x_i$ of the piston 46 and the actual pressure value $p_i$ in the chamber 40, as electric voltage signals. The actual current value $i_{Mi}$ is here a measure of the force with which the electric motor 25 forces the push rod 27 against the part jaw 17. The actual position value $x_i$ of the piston 46 is a measure of the distance between the part jaws 16 and 17 of the clamping jaw 13. The control device 71 processes these signals to form the actuating signal $y_{v1}$, which determines the position of the control piston of the proportional valve 53. A difference former 75 forms a control difference $x_{di}$ from the desired current value $i_{Ma}$ and the actual current value $i_{Mi}$ of the electric motor 25. A differentiator 76 forms the time derivative of the actual pressure value from the actual pressure value $p_i$. In order to improve the control procedure, this signal is combined with the control difference $x_{di}$ in a computing device 77 and supplied to a force controller 78, which forms an actuating signal $y_K$ for a force control loop. A differentiator 80 forms a control difference $x_{dx}$ from the desired position value $x_s$ and the actual position value $x_i$ of the piston 46, said difference being supplied to a position controller 81. The position controller 81 forms an actuating signal $y_x$ for a distance control loop. A changeover device 83 with two controlled changeover switches 84, 85 supplies the proportional valve 53 either with the actuating signal $y_K$, the actuating signal $y_x$ or a constant actuating signal $y_{v10}$ as actuating signal $y_{v1}$. A comparator 88 switches the changeover switch 84 into the lower position if the actual current value $i_{Mi}$ of the electric motor 25 is greater than the threshold value $i_{Mu}$. The threshold value $i_{Mu}$ is chosen such that it lies between the largest value occurring during the movement of the clamping jaw 13 and the value $i_{Ma}$. If, at the same time, the changeover switch 85 is in the upper position, the actuating signal supplied to the proportional valve 53 is equal to the actuating signal $y_K$, and the force control loop is active. If the actual current value $i_{Mi}$ of the electric motor 25 is less than the threshold value $i_{Mu}$, the comparator 88 switches the changeover switch 84 into the upper position. If the changeover switch 85 is simultaneously in the upper position, the actuating signal supplied to the proportional valve 53 is equal to the actuating signal $y_x$ and the distance control loop is active. If the changeover switch 85 is in the lower position, because of an actuating signal $y_u$ which is output by the machine control system 70 and is supplied to a magnet 89, both the force control loop and the distance control group are interrupted. The actuating signal supplied to the proportional valve 53 is equal to the constant actuating signal $y_{v10}$, which is chosen such that the control piston of the proportional valve 53 is in a neutral position, in this case in the central position. In this position, the chambers 40 and 47 of the differential cylinder 41 are connected to each other in a restricted manner, to the pump 54 and to the tank 43.

In order to close the clamping device, in a first step the thrust mechanism 26 pulls the part jaw 17 coupled to it against the fixed clamping jaw 11. In the process, the part jaw 17 pulls the part jaw 16 with it. Since, as the part jaws 16 and 17 are moved, the current $i_{Mi}$ drawn by the electric motor 25 is less than the threshold value $i_{Mu}$, the actuating signal $y_x$ is supplied to the proportional valve 53, and the distance control loop, which keeps the distance between the part jaws 16 and 17 constant, is active. In this case, the piston 32 of the double-ended cylinder 33 rests on the right-hand stop, but can also be clamped in an intermediate position. Once the part jaw 17 has reached the clamping jaw 11, the machine control system 70 locks the latching device 15. The machine control device 70 switches the control piston of the control valve 60 into the position in which the right-hand chamber, provided with the designation 92, of the double-ended cylinder 33 is connected to the chamber 20. If, then, in a second step the electric motor 25 pulls the piston 32 onward in the closing direction, pressure medium is displaced from the chamber 92 into the chamber 20 and the part jaw 17 is pressed against the clamping jaw 11 in the process. The relationships between the areas to which pressure is applied are chosen such that the force exerted on the piston 32 by the electric motor 25 is increased. In this step, the thrust rod 27 is loaded in tension. Since, when loaded in tension, the thrust rod 27 can be acted on with a greater force than is permissible in the case of compressive loading, limiting the tensile force exerted on the thrust rod 27 by the electric motor 25 is not required.

The opening of the clamping device is likewise carried out in two steps. In the first step, the latching device 15 remains locked. The control piston of the control valve 60 is switched into a position in which the chamber 20 is relieved to the tank 43. The force required to open the mold 23 is greater than the force which the thrust rod 27 can transmit under compressive loading without bending impermissibly. The current $i_{Mi}$ drawn by the electric motor 25 rises to a value which is greater than the threshold value $i_{Mu}$. The comparator 88 therefore switches the changeover switch 84 into the lower position, in which the force control loop is active. The pump 54 delivers pressure medium to the chamber 40 and, in this way, assists the force acting in the opening direction. The force controller 78 controls the proportional valve 53 in such a way that the current $i_{Mi}$ drawn by the electric motor 25 is equal to the threshold value $i_{Ma}$. In addition, pressure medium which is displaced from the chamber 35 and supplied to the chamber 40 via the nonreturn valve 36 assists the action of pulling the mold 23 open. Once the mold 23 has been pulled open, the machine control system 70 unlocks the latching device 15 for the second step of the opening procedure. The current $i_{Mi}$ drawn by the electric motor 25 when moving the clamping jaw 13 in the opening direction is less than the threshold value $i_{Mu}$. The comparator 88 thus switches the changeover switch 84 into the upper position again, that is to say from force control to distance control. As an alternative to the distance control, during the second step of the opening procedure the proportional valve 53 can be supplied with the actuating signal $y_{v10}$, which switches the control piston of the proportional valve 53 into the central position.

Figure 2:
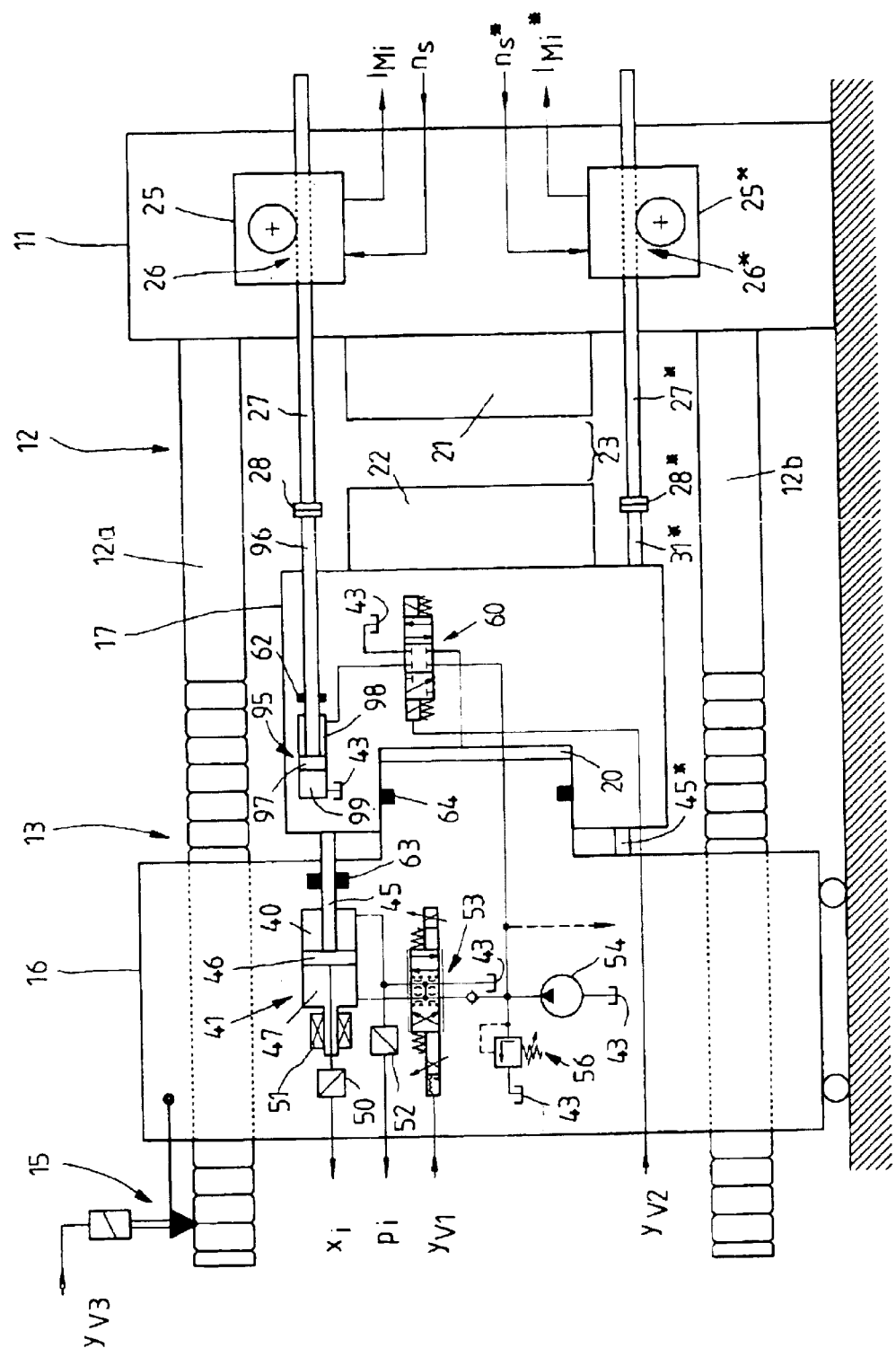
FIG. 2 shows the structure of a second clamping device according to the invention in a simplified illustration.

FIG. 2 shows the structure of a second clamping device according to the invention in a schematic illustration. In terms of its substantial parts, this clamping device corresponds to the clamping device illustrated in FIG. 1. Identical components are therefore provided with the same designations as in FIG. 1. The clamping device illustrated in FIG. 2 likewise has a fixed clamping jaw 11 and a clamping jaw 13 which is formed from two part jaws 16 and 17 and can be displaced along a guide device 12. The guide device 12 is constructed in the same way as in FIG. 1. A chamber 20 to hold hydraulic pressure medium is formed between the part jaws 16 and 17. Two part molds 21 and 22 of a mold 23 are held on the part jaws 16 and 17. A differential cylinder 95 is held on the part jaw 17. A piston 97 connected to a piston rod 96 divides the differential cylinder 95 into a chamber 98 on the rod side and a chamber 99 on the crown side. An electric motor 25 is held on the fixed clamping jaw 11. A thrust mechanism 26 translates the rotational movement of the electric motor 25 into a longitudinal movement of the thrust rod 27, which a coupling 28 transmits to the piston rod 96 of the differential cylinder 95. A control valve 60, whose position is determined by an actuating signal $y_{v2}$, connects the chamber 98 to a pump 54 in a first position and to the chamber 20 in a second position. In the central position of the control valve 60, both the chamber 98 and the chamber 20 are shut off. Instead of the control valve 60 with three control positions, a 2-way control valve can be used if the central position of the control valve 60 is not needed. The chamber 99 is continuously connected to the tank 43, irrespective of the position of the control valve 60. As in FIG. 1, a differential cylinder 41 is held on the part jaw 16, its piston rod 45 being connected to the part jaw 17. The proportional valve 53 controls the flow of pressure medium from the pump 54 to the chambers 40 and 47 of the differential cylinder 41 in accordance with the actuating signal $y_{v1}$. The components provided with an * are—as described in connection with FIG. 1—provided in order to act uniformly with force on the part jaw 17.

The control of the clamping device illustrated in FIG. 2 is carried out in the same way as the control of the clamping device illustrated in FIG. 1, by means of the electric control device 71 illustrated in FIG. 3; in conjunction with the higher-order machine control system 70. The control device 71 receives from the clamping device illustrated in FIG. 2 the actual position value $x_i$ of the piston 46, the actual pressure value $p_i$ in the chamber 40 and the actual current value $i_{Mi}$ of the electric motor 25. The clamping device illustrated in FIG. 2 receives from the control device 71 the actuating signal $y_{v1}$ for the proportional 53 and, from the machine control system 70, the actuating signal $y_{v2}$ for the control valve 60, the actuating signal $y_{v3}$ for the latching device 15 and the desired rotational speed value $n_s$ for the electric motor 25. The combining of the individual signals is carried out in the same way as described above in connection with the control of the clamping device illustrated in FIG. 1.

The force acting on the thrust rod 27 can—as described above—be determined from the current $i_{Mi}$ drawn by the electric motor 25. However, it is also possible to register the force acting on the thrust rod 27 directly, using a force sensor arranged in the force flow, or to determine it via a pressure measurement in the chamber on the rod side of the double-ended cylinder 33 or in the chamber 20.

I claim:

1. An electromechanical clamping device with hydraulic assistance for a production machine, in particular for an injection molding machine, the device comprising:
   two clamping jaws (11, 13) on which in each case a part mold (21, 22) of a divided mold (23) is held,
   one (11) of the clamping jaws is fixed and the other (13) of the clamping jaws is arranged such that it is displaceable with respect to the one clamping jaw,
   a thrust mechanism (26) driven by an electric motor (25) moves the displaceable clamping jaw (13) along a guide device (12),
   the displaceable clamping jaw (13) is divided into two part jaws (16, 17), displaceable with respect to each other in a direction of the guide device (12) and a chamber (20) to hold pressure medium is formed between the part jaws (16, 17),
   the first part jaw (16) is displaceable along the guide device (12) and is lockable with respect to the latter,
   one (17) of the two part jaws is provided with a first cylinder (33), a piston (32) of which is coupled to output (27) of the thrust mechanism (26),
   in a closing operation in order to close the clamping device, in a first step the thrust mechanism (26) pulls the part jaw (17) coupled thereto against the fixed clamping jaw (11), pulling the other part jaw (16) therewith, in a second step the thrust mechanism (26) delivers pressure medium from the first cylinder (33) into the chamber (20) between the two part jaws (16, 17), with the first part jaw (16) locked with respect to the guide device (12),
   in an opening operation in order to open the clamping device, in a first step a second cylinder (41) arranged between the two part jaws (16, 17) pulls the second part jaw (17) against the first part jaw (16), with the first part jaw (16) locked with respect to the guide device (12) and the chamber (20) between the part jaws (16, 17) relieved of pressure; after the mold (23) has been opened, in a second step the thrust mechanism (26) forces the part jaw (17) coupled thereto in opening direction, forcing the first part jaw (16) therewith with the first part jaw (16) unlocked from the guide device (12).

2. The clamping device as claimed in claim 1, wherein the part jaws (16, 17) are spaced apart from each other when the clamping device is closed.

3. The clamping device as claimed in claim 2, wherein a control loop is provided which keeps distance between the two part jaws (16, 17) constant during the first step in the closing operation.

4. The clamping device as claimed in claim 2, wherein the guide device (12) is provided with a latching division, with which a latching device (15) held on the first part jaw (16) interacts.

5. The clamping device as claimed in claim 2, wherein the second cylinder (41) is enabled to have pressure medium applied thereto in the first step of the opening operation such that distance between the two part jaws (16, 17) decreases.

6. The clamping device as claimed in claim 5, wherein the thrust mechanism (26) assists the opening operation, application of pressure medium to the second cylinder (41) being controlled such that force exerted on the second part jaw (17) by the thrust mechanism (26) does not exceed a predefinable threshold value ($i_{Ma}$).

7. The clamping device as claimed in claim 6, wherein current ($i_{Mi}$) drawn by the electric motor (25) is supplied to a force controller (78) as the actual value of the force exerted on the second part jaw (17) by the thrust mechanism (26), and wherein a force controller (78) is supplied with the predefinable threshold value ($i_{Ma}$) as a desired value for said force.

8. The clamping device as claimed in claim 7, wherein control difference ($x_{di}$) formed from the actual value of the current ($i_{Mi}$) drawn by the electric motor (25) and the predefinable threshold value ($i_{Ma}$) has superimposed thereon time derivative of pressure ($p_i$) applied to a piston (46) of the second cylinder (41).

9. The clamping device as claimed in claim 7, wherein position ($x_i$) of a piston (46) of the second cylinder (41) is supplied to a position controller (81) as actual value of the distance between the two part jaws (16, 17), and wherein the position controller (81) is supplied with a desired value ($x_s$) that determines the distance between the two part jaws (16, 17).

10. The clamping device as claimed in claim 9, wherein an actuating signal ($y_x$) from the position controller (81) is supplied to a hydraulic control device (53) if the current ($i_{Mi}$) drawn by the electric motor (25) is less than a second threshold value ($i_{Mu}$), and wherein the hydraulic control device (53) is supplied with actuating signal ($y_K$) from the force controller (78) if the current ($i_{Mi}$) drawn by the electric motor (25) is greater than the second threshold value ($i_{Mu}$), the second threshold value ($i_{Mu}$) being chosen such that it lies between the maximum current required to move a clamping jaw (13) and first-mentioned threshold value ($i_{Ma}$).

11. The clamping device as claimed in claim 10, further comprising a neutral position of the hydraulic control device (53) in which chambers (40, 47) of the second cylinder (41) are connected to each other via restrictors and to a pump (54) and tank (43).

12. The clamping device as claimed in claim 11, further comprising a changeover device (83) which supplies the second hydraulic control device (53) with actuating signal ($y_x$) from the position controller (81), the actuating signal ($y_K$) from the force controller (79) or a constant actuating signal ($y_{v10}$) for neutral position.

13. The clamping device as claimed in claim 1, further comprising a machine control system (70) which controls the individual steps in working sequence of a production machine.

14. The clamping device as claimed in claim 13, wherein parameters and desired values required for control of the working sequence of the production machine are stored in the machine control system (70).

15. The clamping device as claimed in claim 1, wherein the first cylinder is a double-ended cylinder (33), whose piston rod (34) facing away from the thrust mechanism (26) penetrates into a further chamber (35), wherein the further chamber (35) is connected via a first nonreturn valve (36) to a chamber (40) of the second cylinder (41), and the further chamber (35) of the double-ended cylinder (33) is connected via a replenishing valve (42) to a tank (43).

* * * * *